United States Patent

[11] 3,607,631

| [72] | Inventors | Robert R. Hobson<br>San Jose;<br>Robert N. Scott, Livermore; Paul R. Hill,<br>Castro Valley, all of Calif. |
|---|---|---|
| [21] | Appl. No. | 774,227 |
| [22] | Filed | Nov. 6, 1968 |
| [45] | Patented | Sept. 21, 1971 |
| [73] | Assignee | The United States of America as represented by the United States Atomic Energy Commission. |

[54] MODERATED THERMIONIC REACTOR CORE
8 Claims, 2 Drawing Figs.

[52] U.S. Cl..................................................... 176/39, 310/4
[51] Int. Cl..................................................... G21c 1/00, H02n 3/00
[50] Field of Search......................................... 176/39; 310/4

[56] References Cited
UNITED STATES PATENTS

| 3,302,042 | 1/1967 | Grover et al................. | 310/4 |
| 3,440,455 | 4/1967 | Stahl et al.................... | 310/4 |
| 3,441,752 | 4/1969 | Grover et al................. | 310/4 |
| 3,444,400 | 5/1969 | Janner et al. ................ | 310/4 |

*Primary Examiner*—Reuben Epstein
*Attorney*—Roland A. Anderson

ABSTRACT: A moderated thermionic core assembly has been provided which employs vapor chamber condenser-cooled stacked thermionic fuel elements. A cylindrical moderator block is provided with a plurality of radial wells drilled in an ordered array about the periphery of the moderator block. Each well is adapted to receive a tubular fuel element which includes two series-connected nuclear fueled thermionic converter elements having a neutral plasma maintained between the emitter and collector electrodes of each converter. Each fuel element includes a vapor chamber condenser which extracts excess heat from the collectors and transmits it to an external reflector from which the excess heat is radiated to space.

INVENTORS.
Robert R. Hobson
Robert N. Scott
Paul R. Hill

ATTORNEY.

PATENTED SEP 21 1971

INVENTORS.
Robert R. Hobson
Robert N. Scott
BY Paul R. Hill

ATTORNEY.

MODERATED THERMIONIC REACTOR CORE

BACKGROUND OF THE INVENTION

This invention relates to nuclear reactors and more specifically to nuclear reactors wherein the heat from fissioning material is converted directly into electricity.

In providing a power supply for extended space missions, it is necessary to provide a power supply which will provide the power requirements and yet be light in weight, small in size, and highly reliable for extended periods of time. It has been well established that nuclear thermionic converter cells fit these needs and that various systems using thermionic converters have been presented. It is also well known in the art to stack thermionic diodes connected in series electrically having nuclear-fueled emitters to provide fuel elements, a group of which are mounted together to form a reactor core. While these systems are quite compact and efficient, they normally require some type of flowing fluid-coolant through the reactor core to extract excess heat. These cooling systems require pumps and circulating ducts which add weight and consume useful space. Other compact reactors have been provided which use thermal conductive reflector materials to conduct excess heat to an external space radiator. A reactor of this type has been presented in copending application Ser. No. 467,821, filed June 22, 1965, entitled "Nuclear Reactor" by Robert R. Hobson et al. Briefly, the reactor is composed of a cylindrical pipelike unmoderated core with planar thermionic converters mounted on the reactor surface. Heat generated in the reactor core is transferred by conduction to the thermionic converters where a portion of the heat is converted directly to electricity and the remainder is radiated as waste heat.

In the above-described thermionic converter cell the electrical output for a given amount of fuel area is limited to the number of converters which can be mounted about the core periphery. Additional power demands are met by adding additional fuel and converters which add to the fuel inventory and increase weight. Thus, a means is needed which would reduce the fuel inventory through more efficient operation, reduce specific weight and expand the power delivery capabilities of a given thermionic converter cell size and weight.

SUMMARY OF THE INVENTION

This invention provides a thermionic converter cell which overcomes the above-described limitations of the cylindrical space power reactor and has as its primary object to provide a lightweight, compact reactor for generating electrical power directly from fission-generated heat which requires a minimum amount of fissionable material.

A further object of the invention is to provide a moderated thermionic reactor core for the generation of electricity directly from fission-produced heat.

A still further object of this invention is to provide a reactor core for the generation of electricity which employs stacked serially connected thermionic fuel elements with vapor chamber condenser cooling.

Still another object of the present invention is to provide a moderated reactor core which is composed of radially displaced fuel elements for improved excess heat extraction through the use of vapor chamber condensers.

Briefly, the present invention calls for a moderated thermionic reactor core composed of a thermionic converter cell comprising a cylindrical moderator region having a plurality of radial wells therein. An elongated tubular fuel element is disposed in each of the wells. Each of the fuel elements includes a plurality of nuclear-fueled thermionic converter elements having an emitter structure and a collector structure spaced from the emitter structure. The emitter structures each contain a fissile material and a neutral plasma is provided in the area between the spaced emitter and collector structures. A heat exchanger is disposed external of each fuel element and a vapor chamber condenser including a condensable vapor heat transfer medium therein is provided in each fuel element for transmitting excess heat from the collector structure to the external heat exchanger. A means is provided for supporting the collector and emitter structures in spaced relation and connecting the emitters and collectors of each fuel element in electrical series. A cesium reservoir is provided for each fuel element and is connected in vapor communication with the region between each emitter and collector of the element.

Other objects and many of the attendant advantages of the present invention will be readily evident from the following detailed description when taken in conjunction with the accompanying drawings wherein like reference numerals indicate similar items in each figure.

DETAILED DESCRIPTION OF THE PREFERRED EMBODIMENT

In the art, the operation of vapor chamber condensers, sometimes referred to as "heat pipes," as heat conductors is well known. Briefly, the "heat pipe" is a heat transfer device comprising a container, a condensable vapor heat transfer medium disposed in the container, and a capillary means disposed within the container capable of causing the condensed vapor to flow from a cooler area or condenser region of the container to a hotter or vaporization region of the container. The transfer of the vapor through the container uses, as the driving force, the difference in vapor pressures in the vaporization region and the condenser region. The liquid which condenses in the condenser region is returned to the vaporization region by capillary action. The condensate collects in the interior surface wicking or grooving (small channels cut in the interior surface of the container) and flows back to the vaporization region. Thus, fluid circulation is established in the pipe with the vapor formed by heating the vaporization region flowing to the condenser region where it is condensed through release of heat to a heat exchanger in thermal contact with the condenser region. By means of this circulation, a closed-cycle heat transfer device is created to extract heat from the heated region of the "pipe" and transmit it to the nonheated end of the "pipe." These devices transfer heat with a minimal temperature drop. Therefore, an essentially uniform temperature distribution is established along the entire "pipe" surface. For a more detailed discussion of the "heat pipe," see Grover, Cotter, and Erickson, "Structures of Very High Thermal Conductance," 35 Journal of Applied Physics, 1,990 (June 1964).

Figure 1:
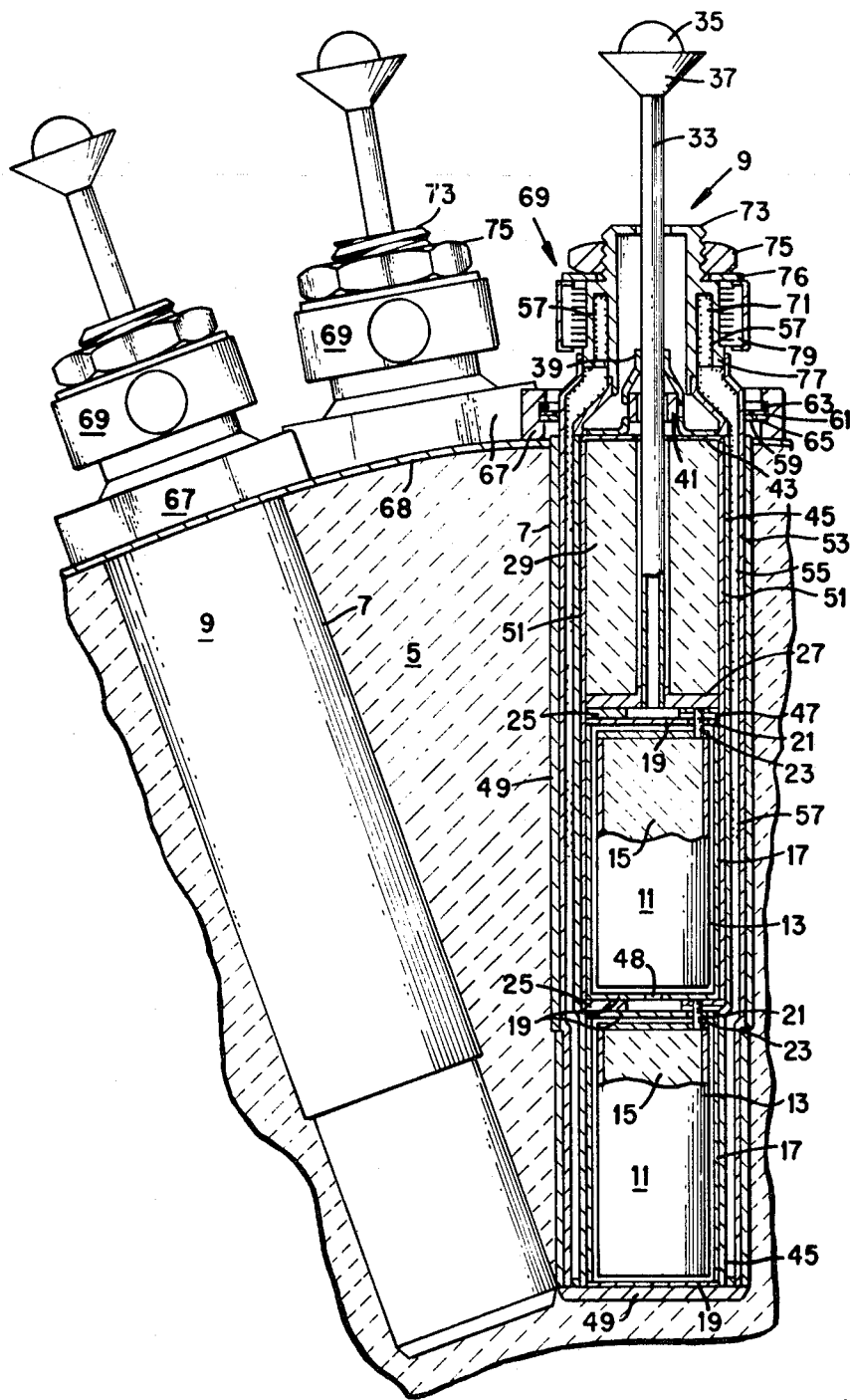
FIG. 1 is a cross-sectional view of a moderated reactor core assembly according to the present invention.

Referring now to FIG. 1, there is shown a thermionic reactor core assembly using vapor chamber condenser cooling for extracting excess heat from the converter element collectors. The reactor is composed of a cylindrical moderator block 5 of a suitable moderator material, preferably a metallic hydride such as zirconium hydride or yttrium hydride. Radial wells 7 of diameters appropriate to receive tubular fuel elements 9 are located in the moderator block 5 in an ordered array so as to position the fuel elements 9 relative to each other.

Each fuel element 9 contains two or more stacked thermionic converter elements or cesium vapor diodes connected in series electrically. Each converter element consists of an emitting structure 11 which consists of a refractory metal such as tungsten. The emitter is formed in a cylindrical electrode can 13 which contains a fissile fuel 15, such as uranium dioxide ($UO_2$). The emitter structure is surrounded by a collector structure which consists of a nickel cylinder 17 enclosed at each end by end plates 19. Each end plate is provided with holes 21 of substantially larger diameter than the diameter of electrically conductive support pins 23 to insulate pins 23 from plates 19. There are at least 3-emitter support pins and corresponding holes 21 to properly support emitters 11, only one is shown in the drawing. The pins 23 support the emitters 11 in spaced relation with their corresponding collector housing 17. Each converter is electrically insulated from its adjacent converter by insulating spacer rings 25. The outermost ring 25 insulates the outermost converter from a metal reflector support plate 27. Plate 27 supports a cylindrical neutron reflector 29. Reflector 29 has a central cylindrical opening through which extends a cesium vapor supply tube 33. Tube 33 has one end connected to reflector support plate 27 and extends outward of the fuel element so that the cesium reservoir 35 mounted on the other end of tube 33 is at sufficient distance from the reactor to provide proper cesium cooling. A conical heat shield 37 is provided about the base of reservoir 35 to shield the reservoir from the reactor heat. The cesium vapor supply tubes are supported by the cesium vapor envelope structure which includes a generally cylindrical supply tube support member 39 having one end rigidly connected in a vapor seal fit to tube 33. The other end of member 39 is vapor seal connected to one end of a cylindrical insulator sleeve 41. The other end of sleeve 41 is connected to a disk-shaped enclosure member 43. Disk 43 has its outer periphery connected to a tubular enclosure member 45. The cesium envelope includes the cesium reservoir 35, tube 33, enclosure member 45, disk 43, and supply tube support member 39. The cesium vapor flows into the area of each emitter and collector spacing through radial slots 47 provided in the insulator rings 25, opening 21, and out through openings 48 in the lower collector end plates 19.

As can be seen from the above description the cesium vapor supply tube 33 can be used as one external electrode and tubular enclosure member 45 can be used as the other electrode. Thus, the electrical path is provided through the supply tube 33 to the emitter 11 of the first diode by means of a support pin 23. By the same manner each of the diodes of one fuel element is connected in series by means of the connector pins from the collector to the emitter of the adjacent diode to the last diode in which case the collector is connected to member 45. Each fuel cell is insulated from the others by means of an insulating sheath 49 which lines the side and bottom surfaces of the wells. The outer converters of each fuel element are surrounded by an insulator sheath 51 to electrically insulate the outward collectors from the innermost collector and to provide a thermal conduction path for heat from the collectors to the tubular member 45.

Tubular member 45 also forms the inner tube of a vapor chamber condenser. An outer vapor chamber condenser tube 53 is spaced from the inner tube 45. The annulus 55 formed by the inner tube 45 and the outer tube 53 contains the capillary wicking or grooving 57 and the vaporization chamber for the vapor chamber condenser. Both the fuel elements and the moderator 5 are cooled by the vapor chamber condensers. The outer tube 53 of the vapor chamber condenser forms the outer structural member of the fuel elements. The outer end of tube 53 has an annular flange 59 which holds the fuel in the moderator block by means of a washer 61 and snap ring 63 which fits into groove 65 in a support ring 67 connected to the moderator cladding 68.

A heat exchanger 69 is provided at the outer extremity of each fuel element and has an inner annular chamber 71 to which the inner tube 45 and outer tube 53 are extended and vaportight connected to complete the vapor chamber condenser cooler. The annular chamber 71 is also provided with wicking 57 and forms the above-described condensation chamber of the vapor chamber condenser. The entire structure of the vapor chamber condenser is made of stainless steel and the condensable vapor heat transfer medium disposed inside is sodium which becomes liquefied at operating temperatures. The inner wall 73 of chamber 71 extends outward and is provided with threads on the outer surface whereby a nut 75 is threaded thereon to hold a conductor connector washer 76 (FIG. 2) which is electrically connected through wall 73 and inner tube 45 to the innermost collector 17. Wall 73 is spaced from the cesium supply tube 33 to provide electrical insulation since tube 33 is, as pointed out above, the other external electrode of the fuel element.

Figure 2:
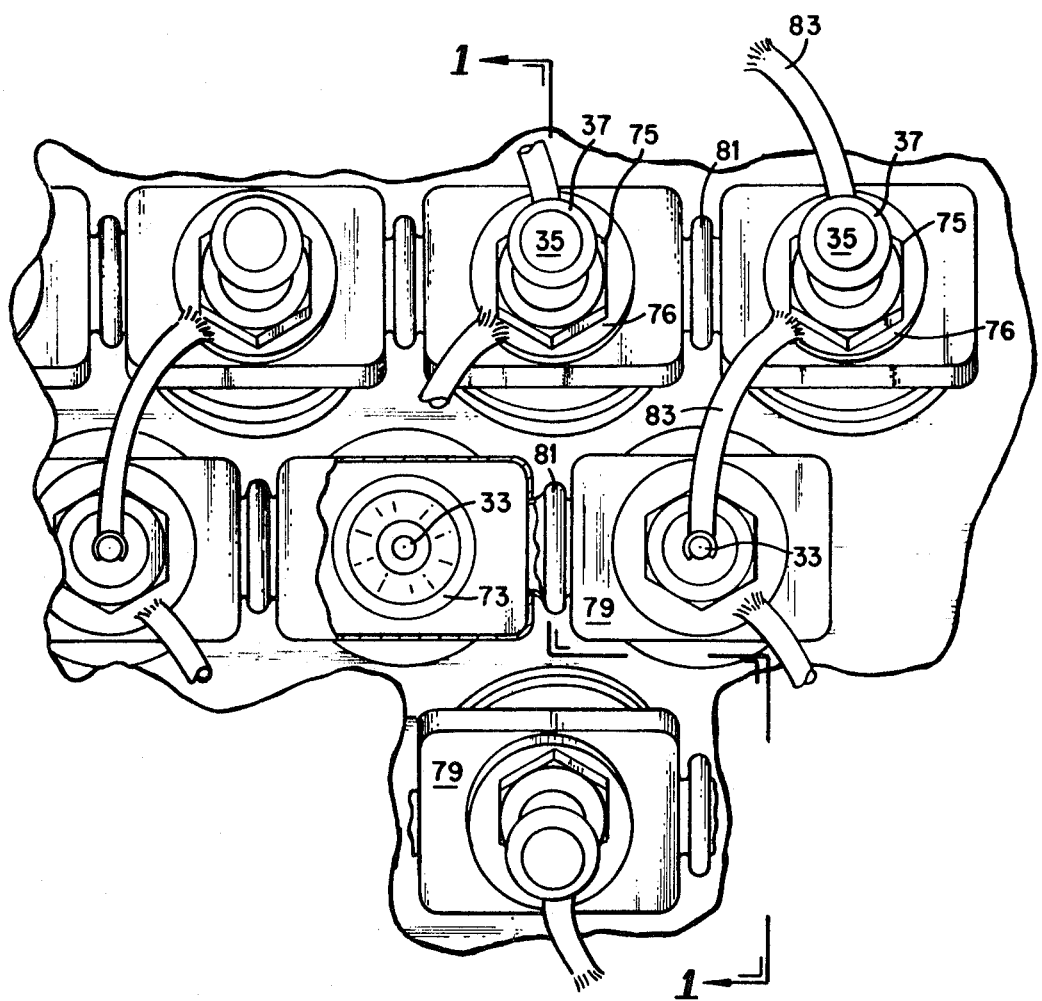
FIG. 2 is a view of the outer surface of the reactor shown in FIG. 1.

The outer wall 77 of chamber 71 is surrounded by a radiator manifold 79 which serves to cool the condensation chamber 71 of the vapor chamber condenser. As shown in FIG. 2, the radiator manifold 79 is provided with a manifold connector 81 which connects longitudinal rows of fuel elements together for parallel electrical connection. The manifold 79 may take the form of an independent vapor chamber condenser. If the heat exchanger and manifold are not used and it is desirable to connect rows of fuel elements in parallel, a parallel electrical connector must be substituted for the manifold connector 81. The fuel elements may be connected electrically in any desired combination of parallel and series connections to obtain a desired voltage output and provide redundancy. One possible combination is shown in FIG. 2 in which each longitudinal row of fuel elements is connected in parallel by means of manifold 79 and manifold connectors 81 and the longitudinal rows are circumferentially connected in series by the electrical series connectors 83 which connect the electrical-connecting washers 76 to the cesium supply tubes 33 of fuel elements in adjacent rows. The series connectors 83 of the first row (not shown) are connected to a reactor output bus, and the manifold from the last row (not shown) is connected to the other reactor output bus.

The reactor may be controlled in a number of ways as by dividing the moderator block 5 into half-cylinders to be moved apart for control as described in the above-referenced copending application. Other means of control may also be used as by including a longitudinally movable central reflector in the moderator core region. Each end of the cylindrical moderator block 5 is enclosed by an end reflector disk (not shown) to complete the reactor assembly and provide proper shielding.

From the above description, it can be seen that a power reactor has been provided which is very advantageous in space applications. By the application of vapor chamber condensers to extract excess heat from the converter cell collectors the fuel elements can be disposed in a moderator block in a very compact arrangement. The preferred arrangement shown herein takes full advantage of the moderator region 5 by allowing the inward end of the wells 7 in a circumferential row to touch thereby reducing the overall size and weight of the reactor. By using the stacked fueled converter elements the fuel inventory is decreased as opposed to a cylindrical core region reactor with converter elements mounted on the periphery and further by stacking the converter elements the power delivery capacity can be increased without a substantial increase in total reactor size.

A summary of the characteristics of the preferred embodiment is given below for a reactor containing two converter elements per fuel cell.

| MATERIALS | |
|---|---|
| Fuel | Enriched $UO_2$ |
| Emitter | Tungsten |
| Collector | Nickel |
| Insulators | $Al_2O_3$ |
| Vapor Chamber Condenser Tubing (VCC) | Stainless Steel |
| VCC wick | Stainless Steel |
| Moderator | Zirconium Hydride |
| TEMPERATURES °K | |
| Moderator | 1,450°K |
| Emitter | 1,900°K |
| Collector | 1,400°K |

While the invention has been described specifically with reference to a particular embodiment thereof, it will be understood that various changes and modifications may be made, all within the field and intended scope of the following claims.

What is claimed is:

1. In a nuclear reactor, a thermionic converter cell comprising:
   a cylindrical moderator region, said moderator region having a plurality of radial wells drilled therein at intervals about the periphery of said cylindrical moderator region in an ordered array;
   a plurality of elongated tubular fuel elements, equal in number to said plurality of wells, retained in said wells;
   each of said tubular fuel elements including a plurality of nuclear-fueled thermionic converter elements;
   each of said converter elements including an emitter structure containing a fissile material, a collector structure spaced from said emitter structure;
   a cesium vapor between each of said emitters and collectors to promote thermionic emission from said emitters, a heat exchanger disposed external of said moderator region, a vapor chamber condenser including a condensable vapor heat transfer medium disposed therein;
   said vapor chamber condenser including a vaporization region in thermal conductive contact with said collectors and a condenser region connected in fluid communication with said vaporization region and in thermal conductive contact with said heat exchanger thereby transmitting waste heat from said collectors;
   means including first and second external electrical electrodes for connecting said emitters and collectors in electrical series whereby electrical power is extracted from said converter elements;
   means for supporting said emitter structure and said collector structure in spaced relation; and
   a cesium vapor reservoir in vapor communication with the region between said emitter and collector for supplying said cesium vapor between said emitter and collector.

2. A thermionic converter cell as set forth in claim 1 wherein said elongated tubular fuel element includes means defining an inner tube surrounding said converter elements, means defining an outer tube surrounding said inner tube in spaced relation forming an annulus therebetween, said annulus defining said vaporization region of said vapor chamber condenser, means defining an annular chamber at the exterior end of said fuel element, said inner and outer tubes being extended external of said moderator region and connected to said annular chamber in fluid communication therewith, said annular chamber comprising said condenser region of said vapor chamber condenser, and said means defining said annular chamber being electrically connected to said collector of the innermost converter element through said inner tube thereby providing said first exterior electrode.

3. A thermionic converter cell as set forth in claim 2 wherein said tubular fuel elements further include a neutron reflector cylinder mounted in the outward extending end of said inner tube, means for electrically insulating said reflector from said inner tube, a cesium vapor supply tube extending inward of said fuel elements from said reservoir, said reflector having a central opening through which said cesium vapor supply tube extends, said reflector having an electrically conductive annular support disk rigidly connected to the inner extended end of said reflector to which the inward extended end of said supply tube is connected, and means for electrically connecting said annular support disk to said emitter of the outermost converter element thereby electrically connecting said cesium vapor supply tube in series with said converter elements to provide said second exterior electrode.

4. A thermionic converter cell as set forth in claim 1 wherein said condensable vapor is sodium.

5. A thermionic converter cell as set forth in claim 3 wherein said emitter structure includes a cylindrical can surrounding said fissile material therein, said emitter can being constructed of tungsten, said collector structure including a cylindrical can surrounding said emitter can in spaced relation therefrom, said collector being constructed of nickel and having a cesium vapor passageway in each end thereof for allowing said vapor to communicate with the regions between said emitter and collector to promote electron emission from said emitter, each of said collector cans being contained within said inner tube of said fuel element, means for electrically insulating each of said collectors, excluding said innermost converter element collector, from said inner tube, and said innermost converter element collector being connected directly to said inner tube.

6. A thermionic converter cell as set forth in claim 5 wherein said fissile material is enriched $UO_2$.

7. A thermionic converter cell as set forth in claim 5 wherein said means for electrically connecting said emitters and collectors in series includes an annular insulator disk disposed between each of said converter elements, a plurality of electrically connective support pins connecting the emitter of one converter to the collector of an adjacent converter element, each collector having openings at the end through which said pins extend from corresponding respective emitters larger than the diameter of said support pins to provide electrical insulation, an insulator sheath surrounding said outer tube of said fuel element for electrically insulating said fuel element from said moderator region.

8. A thermionic converter cell as set forth in claim 1 wherein said cylindrical moderator region is composed of zirconium hydride.